Mar. 13, 1923.
H. B. HATCH
FRUIT SIZING MACHINE
Filed Dec. 2, 1921    2 sheets-sheet 1
1,448,689
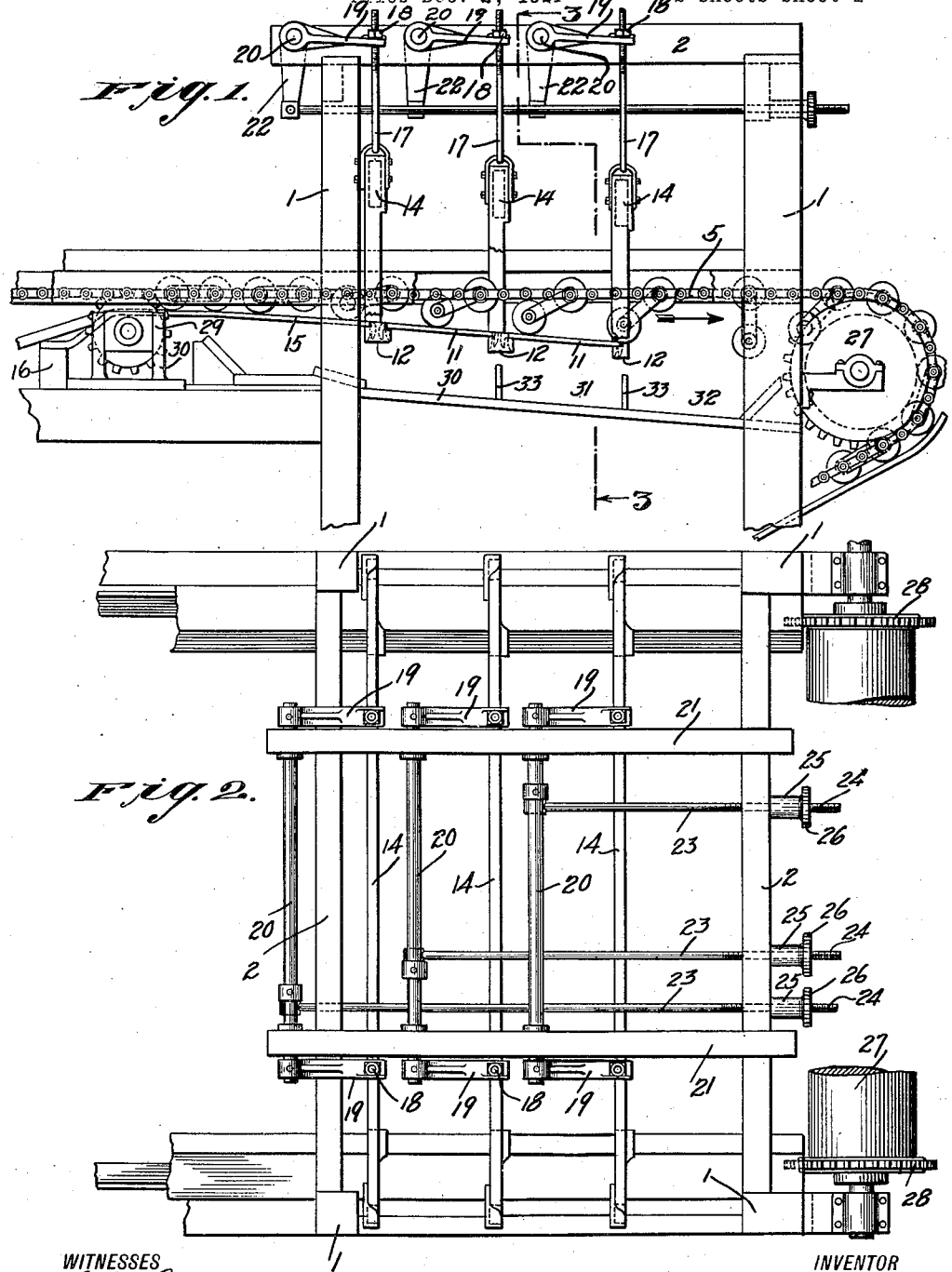
WITNESSES
INVENTOR
H. B. HATCH
BY
ATTORNEYS

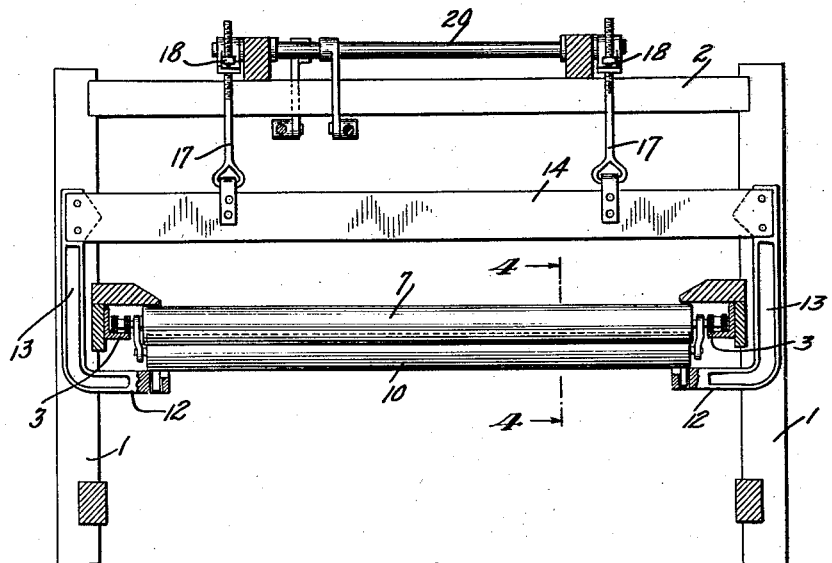
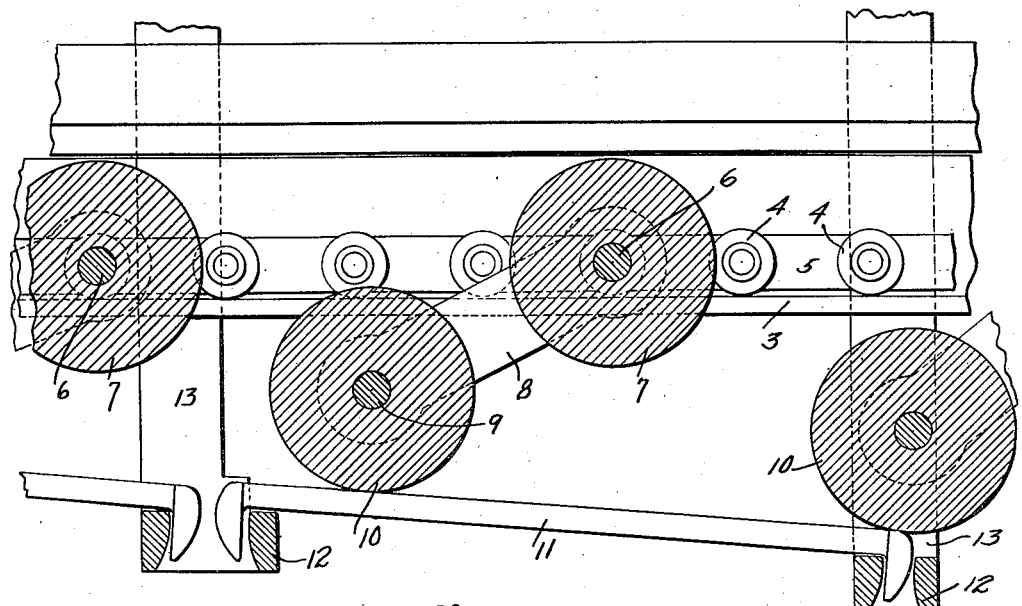

Patented Mar. 13, 1923.

1,448,689

UNITED STATES PATENT OFFICE.

HUGH B. HATCH, OF DUNEDIN, FLORIDA, ASSIGNOR TO SKINNER MACHINERY COMPANY, OF DUNEDIN, FLORIDA, A CORPORATION OF FLORIDA.

FRUIT-SIZING MACHINE.

Application filed December 2, 1921. Serial No. 519,491.

*To all whom it may concern:*

Be it known that I, HUGH B. HATCH, a citizen of the United States, and a resident of the city of Dunedin, in the county of Pinellas and State of Florida, have invented certain new and useful Improvements in Fruit-Sizing Machines, of which the following is a full, clear, and exact description.

The present invention relates to machines for grading fruit, vegetables, etc., having a general spherical shape which, as is well known to those skilled in this art, are assorted before packing for market into groups having a range of sizes within arbitrarily fixed limits, the range of sizes in any particular group being dictated by the desire to pack a given number in a given size case.

The invention particularly relates to that type of sizing machine which embodies a traveling carrier or conveyor arranged to support the fruit and to carry it along until the point of discharge for fruit of a particular size shall have been reached, at which point one of the elements which supports the fruit shall have moved to such an extent with relation to an adjacent element, as to permit the release of the fruit supported therein, and deposit it in that group to which it belongs.

It is desirable at times to adjust and regulate the degree to which the movable element will be permitted to move with relation to the adjacent fixed element, and thus adjust and regulate the point of discharge from the sizing conveyor of the fruit supported thereby and the range of sizes contained in any particular group.

The object of my invention, therefore, is to provide in a fruit sizing machine comprising a movable conveyor composed of relatively fixed and relatively movable members of means for simultaneously adjusting the supports of the relatively movable members, and a further object is to locate the adjusting devices so that they shall be readily accessible at one end of the machine.

To the above ends the present invention consists of a fruit sizing machine comprising a sizing conveyor having transversely extending parallel elements, one of said elements having a movement with relation to the other element and adjustable supports for the movable element, to control its path of movement and means to simultaneously adjust the adjustable supports at opposite sides; and it further consists of the devices and combination of devices which will be hereinafter described and claimed.

The invention is illustrated in the accompanying drawings in which Figure 1 shows in side elevation partly broken away, a sufficient portion of a fruit grading machine embodying my invention to make it clear to the observer.

Figure 2 shows a top plan view of the portion of the machine illustrated in Figure 1 with the roller broken away.

Figure 3 shows a vertical sectional view taken on the line 3—3 in Figure 1.

Figure 4 shows an enlarged view of a portion of the sizing conveyor and the supports therefor, parts being shown in vertical section.

Figure 5 is a fragmentary detail of the coupling between the track sections constituting the adjustable support for the vertically removable elements of the sizing conveyor.

Similar reference characters will be employed throughout the specification and drawing to designate corresponding parts.

The machine comprises a suitable frame to support the operating parts, and as such frame is shown it consists of vertical uprights 1, there being four of such uprights which are connected at their upper ends by the cross bars 2. Upon the inner surfaces of the cross bars 1 there are supported in any suitable manner fixed tracks 3 upon which rest rollers 4 of the parallel link chains 5, which chains at intervals carry the shafts 6 extending between the pair of chains, upon which shafts are supported to freely rotate the relatively large rollers 7. Also mounted on the shaft 6 are links 8 free to rock thereon and which at their opposite ends carry a shaft 9 supporting a roller 10 preferably of the same diameter as the roller 7 and like the roller 7 extending across the machine and of substantially the same length as the roller 7.

The construction just described, as will be noted in Figure 1 of the drawing, produces what we have referred to as a sizing conveyor comprising a pair of parallel chains supported upon the fixed tracks 3 and a plurality of pairs of fruit supporting and sizing rollers, one of each pair supported by the tracks 3 and moving in a fixed path, while the other may fall and rise or have a downward and upward movement with relation to the fixed roller of the next adjacent pair of rollers, the arrangement being such that the movement of the roller 10 of one pair in relation to the roller 7 of the next adjacent pair, permits the fruit to be supported and to be dropped at predetermined points along the path of travel of the sizing conveyor.

The rollers 10 are supported by tracks 11, extending along the opposite sides of the machine and arranged to support the rollers 10 at the opposite ends thereof, and preferably the tracks 11 are made up of relatively short sections which may be adjusted in relation to each other and thus adjust and regulate for independent sections along the path of movement the relative extent of movement between the rollers 10 of one pair of rollers and the rollers 7 of an adjacent pair of rollers. The sections of the tracks 11 are loosely connected and supported at their opposite ends in the inturned bracket arms 12 of the brackets 13 which are connected to and depend from the opposite ends of cross bars or hangers 14. There are three such cross bars or hangers 14 and depending brackets shown in the drawing, one engaging and supporting the free ends of the outer sections of the tracks 11 and an intermediate one engaging and supporting the ends of two adjacent sections of tracks 11, and the rear one supporting the rear end of the sections and the forward end of spring sections 15 which at one end are fastened to a block 16 and from which point forward the spring sections may be moved up and down.

Each of the hangers 14 are suspended from the threaded rods 17 which rods at their upper ends are provided with adjusting nuts 18 which rest upon the crank arms 19 through which the rods 17 pass and by means of which they are supported and moved up and permitted to drop down when required. It is, of course, understood that as shown in Figure 2 there will be two sets of threaded rods and crank arms located at opposite sides of the center of the machine, and as shown in Figure 2 the crank arms 19 are mounted upon the opposite ends of rock shafts 20 mounted to turn in the cross bars 21.

For the purpose of turning the rock shafts 20 they will each of them be provided with downwardly extending crank arms 22 each of which will be engaged by a pivotedly connected rod 23 which rods 23 extend forward and pass through the cross piece 2 at the front end of the machine, and at their forward ends they are threaded as shown at 24 and are engaged by threaded sleeves 25 provided with hand wheels 26, by means of which the rods may be drawn forward to rock the shafts 20 to vertically elevate the sections of the tracks 11, or the rods may be permitted to recede and thus lower the sections of the tracks 11. It is, of course, understood that the adjusting devices each control and adjust the tracks 11 simultaneously at opposite sides of the machine.

The sizing conveyor is of course endless, and it is supported and driven by rollers 27 and sprocket wheels 28 supported at opposite ends of the machine only one of such rollers being shown, and in operation the upper run of the sizing conveyor moves in the direction of the arrow shown in Figure 1. Preferably, a supporting roller 29 will be employed mounted in bearings 30 to prevent the carrier from sagging at the point at which the rollers ride upon the spring sections 15 of the track.

In operation the fruit to be sized will be delivered upon the sizing conveyor and will be supported between adjacent rollers and carried along in the direction of the arrow. As the rollers pass over the adjustable sections 15 and 11 of the track the movable roller drops and thus causes the fruit to be supported between the movable roller of one pair and the fixed roller of the next adjacent pair. As the space between these two rollers gets larger and larger the fruit will be released, the smaller fruit being first released and thereafter the larger fruit, and as will be understood by those skilled in this art, the various sizes of fruit within a huge range of sizes will be released and dropped between given points and will fall either within the space 30, 31 or 32 divided by partitions 33 and carried from the machine.

It will be noted that the chains carrying the rollers are supported upon opposite sides of the machine and that the adjustable tracks are supported on the hanging brackets which extend downward and then inward from the sides, thus obviating the necessity of having cross braces, and permitting a perfectly free and unobstructed passage of the fruit from the conveyor to the support which leads it from the machine.

It will be observed that by making the supporting tracks for the movable rollers in sections, one section may be adjusted relatively to an adjacent section, and that each section is adjustable by means of the adjusting nuts 18 to secure the desired level, and that by means of the hand wheels 26 located at the front of the machine both sides of the track may be simultaneously adjusted.

It will be further noted that by the adjustable connection of the hanger 14 with the crank arms 19 by means of the threaded portions of the rods 17 and the nuts 18, a preliminary levelling adjustment of the tracks 11 may be accomplished wholly independent of the simultaneous adjustment of the tracks at opposite sides of the conveyor which is secured by the rods 23 and the intermediate mechanism.

It is to be further noted that the means for supporting the tracks are located entirely at opposite sides of the track and located at the outer side thereof extending inward from each side, which provides a clear and unobstructed passage between the tracks for the passage of fruit without liability of striking any cross bars, which is quite an important feature of the present invention.

I claim:

1. In combination, a sizing conveyor, a sectional adjustable track for supporting opposite sides of the conveyor, a hanger supporting the said track sections, a rocking shaft supporting the said hanger, means for adjusting the hanger with relation to the rocking shaft, and means for rocking the said shaft.

2. In combination, a sizing conveyor, a sectional track located at opposite sides of the conveyor and supporting the same, said sectional track comprising a spring section.

3. In combination, a sizing conveyor, a sectional adjustable track supporting the opposite ends of the conveyor, a hanger for supporting each pair of track sections, a rocking shaft supporting said hanger, and means for rocking said shaft.

4. In combination, a sizing conveyor, adjustable track sections supporting the opposite sides of said conveyor, a hanger adjustably mounted above the track sections, and supports for the track sections carried by the hanger upon the outer side of the track sections and projecting inwardly beneath said track sections upon opposite sides of the machine.

5. In combination, a sizing conveyor, adjustable tracks supporting the opposite sides of said conveyor, means for securing a leveling adjustment of said tracks, and independent means for simultaneously adjusting the tracks upon opposite sides of the conveyor.

6. In combination, a sizing conveyor, adjustable tracks supporting the opposite sides of said conveyor, means for securing a leveling adjustment of said tracks, and independent means for simultaneously adjusting the tracks upon opposite sides of the conveyor, the latter means including operating rods extending forward to the front end of the machine.

HUGH B. HATCH.